UNITED STATES PATENT OFFICE.

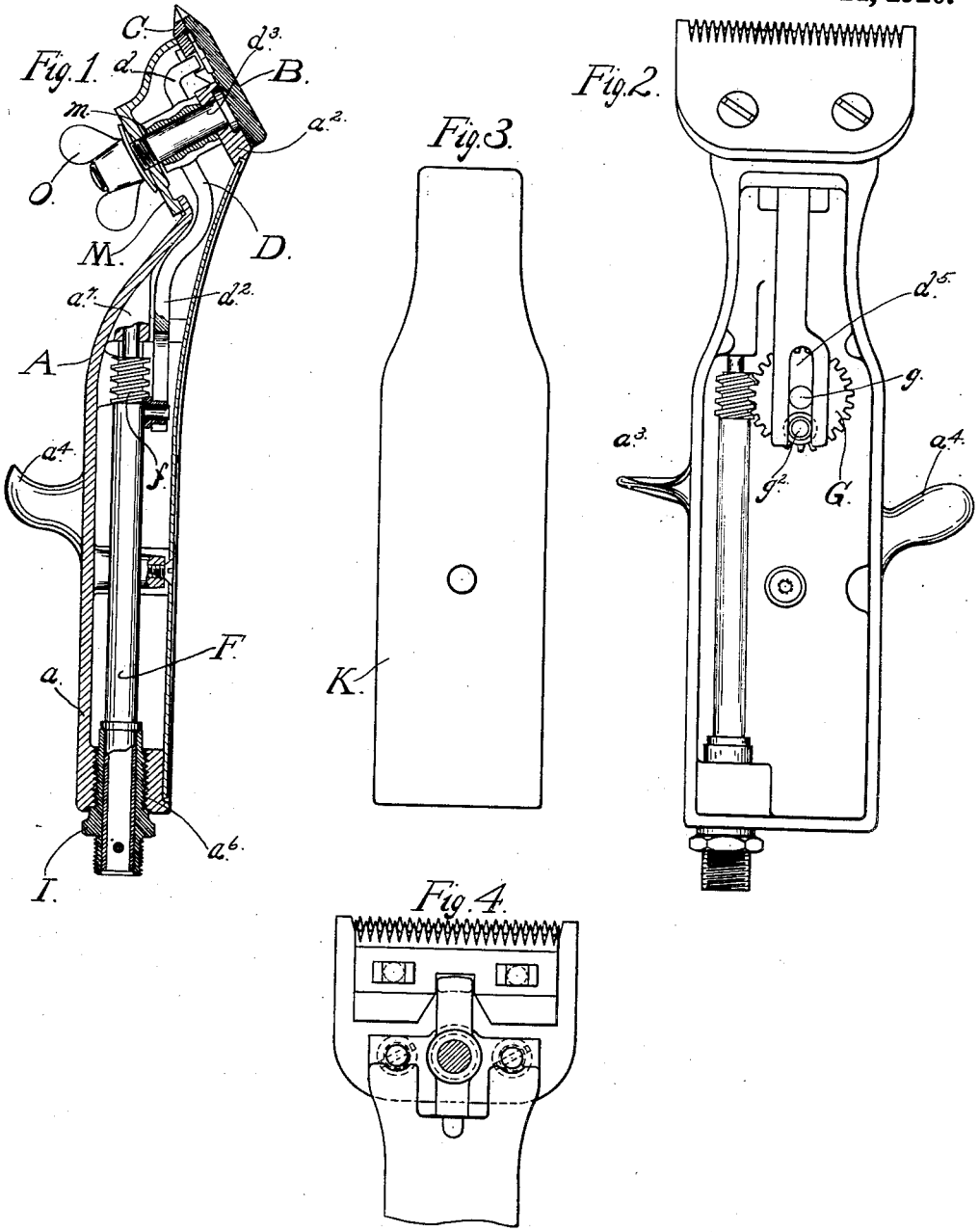

WILLIAM GENTRY SHELTON, OF NEW YORK, N. Y.

POWER-DRIVEN IMPLEMENT FOR CUTTING HAIR OR THE LIKE.

1,361,916. Specification of Letters Patent. Patented Dec. 14, 1920.

Application filed February 15, 1919. Serial No. 277,126.

*To all whom it may concern:*

Be it known that I, WILLIAM GENTRY SHELTON, a citizen of the United States of America, residing in the borough of Manhattan, city, county, and State of New York, have invented certain new and useful Improvements in Power-Driven Implements for Cutting Hair or the like, of which the following is a specification.

This invention relates to improvements in power-driven clippers or implements for cutting hair or the like, and aims to provide improvements therein.

The present invention provides a device wherein all of the working parts are inclosed, and whereby said working parts are protected from the entrance of hair clippings or other foreign matter.

The invention further provides a device which may be readily manipulated, and the cost of which is considerably cheapened, even as regards the present hand-operated form of clipper.

The invention further provides a device wherein the parts may be readily assembled and removed. Other features of improvement will be hereinafter set forth.

An embodiment of the invention is illustrated in the accompanying drawings; wherein—

Figure 1 shows a longitudinal section of said embodiment.

Fig. 2 is a rear view of said embodiment, with the cover plate removed.

Fig. 3 shows the cover plate.

Fig. 4 is a top plan view of the cutting end of the implement, the top cover plate being removed.

In said drawings, the letter A designates a casing comprising a body portion $a$ and a head portion $a^2$.

The body portion $a$ of the casing constitutes the gripping portion or handle of the implement, and for convenience of manipulation it is provided with the lugs $a^3$, $a^4$.

To the head $a^2$ is secured a toothed plate B, which together with a reciprocatory toothed plate C, constitutes the cutting means.

The reciprocatory toothed cutting plate C is operated by means of a two-arm lever D, having arms $d$, $d^2$, and pivoted upon a pin $d^3$ secured to the head $a^2$ of the casing. The two-arm lever D receives motion from a rotary shaft F through the intermediary of a worm $f$, secured on said shaft, and a toothed crank disk G which meshes with said worm. The crank disk G turns upon a stud $g$, $g$, attached to the casing, and has an eccentric pin $g^2$ thereon, which works within a slot $d^5$ in the arm $d^2$ of the two-arm lever D, thereby oscillating said arm when the crank disk G is rotated.

The rear end of the casing A is preferably provided with a threaded opening $a^6$ which is of sufficient size to admit the worm $f$ on the shaft F. A threaded bushing I fits within the opening $a^6$, and constitutes a bearing for the shaft F. A socketed boss $a^7$ provides a bearing for the opposite end of the shaft F. The shaft F is adapted to be connected to and driven by a flexible shaft, driven by any suitable form of motor. Any light electric motor may be readily used, inasmuch as the worm and gear construction serves to reduce the speed and also to impart a relatively strong force to the lever D.

The casing A is preferably open at its underside, and closed by a simple cover plate K. This cover plate K serves to exclude foreign matter from the casing, and also permits of ready access to the parts within the body of the casing. The head of the casing is preferably formed with an opening at its top or upper side, and a cover M is provided for closing this opening. This cover M also serves for pressing the cutter plate C against the cutter plate B, this being effected through a wing nut O threaded upon the pin $d^3$, the cover M having an opening $m$ through which said pin passes. By tightening or loosening the nut O, the friction with which the parts B and C contact with one another may be varied.

The casing A may be formed of cast metal, and hence may be more cheaply formed than wrought handles of the character usually found on hand-operated clippers. In fact, the only parts which need be made of especially good steel are the cutter plates B and C.

The inventive ideas may be otherwise embodied than as illustrated in the embodiment herein specifically shown and described.

What is claimed is:

1. An implement for cutting hair or the like, comprising a casing, said casing having a hollow body portion, with an opening at the back, and a head portion $a^2$ integral with said body portion, and having an opening at the top, a toothed plate secured to said head portion, a reciprocatory toothed cutting plate above said fixed toothed plate, a lever adapted to actuate said reciprocatory toothed plate, and gearing adapted to actuate said lever, comprising a worm and gear and a shaft running longitudinally of the casing, a cover plate over the opening in the head part of said casing and a cover-plate over the opening in the back of the body part of said casing, said casing and covers thereon entirely inclosing the working parts of the implement except the toothed end of the reciprocatory cutting plate, said body portion of the casing being broad, flat and long and constituting a handle adapted to be grasped in and held by the entire hand.

2. An implement according to claim 1 characterized by the top cover plate constituting a bearing for the upper side of the reciprocating cutter.

In witness whereof, I have hereunto signed my name.

WILLIAM GENTRY SHELTON.